United States Patent
Yamauchi et al.

(10) Patent No.: US 6,798,546 B1
(45) Date of Patent: Sep. 28, 2004

(54) SCANNING DOCUMENT READER AND MEMORY MEDIUM STORING SCANNER DRIVER PROGRAM

(75) Inventors: Junichi Yamauchi, Kawasaki (JP); Makoto Kisanuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/515,892

(22) Filed: Feb. 29, 2000

(30) Foreign Application Priority Data

Mar. 5, 1999 (JP) .......................................... 11-058409

(51) Int. Cl.⁷ ................................................ H04N 1/04
(52) U.S. Cl. ...................... 358/488; 358/498; 358/496; 399/365; 399/367
(58) Field of Search ................................ 358/488, 474, 358/498, 496, 486, 462, 505; 399/365, 367, 45, 17

(56) References Cited

U.S. PATENT DOCUMENTS 5,107,350 A * 4/1992 Omori ......................... 358/461

FOREIGN PATENT DOCUMENTS

| JP | 61-140440 | | 6/1986 | |
|---|---|---|---|---|
| JP | 401078073 A | * | 3/1989 | ............ H04N/1/40 |
| JP | 2-215269 | | 8/1990 | |
| JP | 4-306065 | | 10/1992 | |
| JP | 4-342089 | | 11/1992 | |
| JP | 200026603 A | * | 9/2000 | ............ H04N/1/40 |

* cited by examiner

Primary Examiner—Kimberly Williams
Assistant Examiner—Negussie Worku
(74) Attorney, Agent, or Firm—Westerman, Hattori, Daniels & Adrian, LLP (57) ABSTRACT

A control device for controlling a medium reader having a medium transport roller whose having in a color distinguishable from a color of a medium. The control device has a decision means for deciding a valid data portion depending on the color of the medium transport roller, from data read by the medium reader. The valid data portion can be decided upon the reading of a first line, and the subsequent reading of the second line and so on can be carried in the range of the valid data portion. The control device also has a decision means for deciding a final line of a medium when the color of all the data read becomes identical to the color of the surface of the roller. A medium reader and a memory medium are also disclosed.

20 Claims, 10 Drawing Sheets

READ DATA IN ONE LINE

SCANNING DOCUMENT READER AND MEMORY MEDIUM STORING SCANNER DRIVER PROGRAM

BACKGROUND OF THE INVENTION

1. Field of the Invention

The present invention relates to a scanning document reader and a memory medium having a scanner driver program stored therein, and more particularly, to a control device for a scanning document reader and a memory medium having a scanner driver program in which in a sheet-feed type scanner, the color of a surface of a feed roller for feeding mediums is distinguishable from the color of the medium so that the region of the medium on the feed roller can be recognized, by judging a difference between the color of the feed roller and the color of the medium.

2. Description of the Related Art

Conventional scanning document readers are disclosed, for instance, in Japanese Unexamined Patent Publications (Kokai) No. 61-140440, No. 2-215269, No. 4-306065 and No. 4-342089.

In the aforesaid conventional scanning document reader, Japanese Unexamined Patent Publication (Kokai) No. 61-140440 discloses a document detection mechanism using sensors for detecting the presence or the absence of a document, and a leading end and a trailing end of the document, by providing a cognate color portion having a reflectivity cognate with that of a standard document and a different color portion on the surface of a rotary unit for transporting a document. Japanese Unexamined Patent Publication (Kokai) No. 2-215269 discloses a scanner device for deciding an effective image width in the main scanning direction in a scanning area, based on the continuity of black bits in the main scanning direction and the number of black bits in the sub-scanning direction, when a scanning area is scanned and sub-scanned. Japanese Unexamined Patent Publication (Kokai) No. 4-306065 discloses a facsimile device in which a platen roller located at a scanner reading position is painted black, so that an inclination of a document is calculated and compensated for transmission, based on line data read from the first line to several lines down from the first line. Japanese Unexamined Patent Publication (Kokai) No. 4-342089 discloses a character inputting and processing method for efficiently clipping out a hand written text from a hand written document.

Figure 10A:
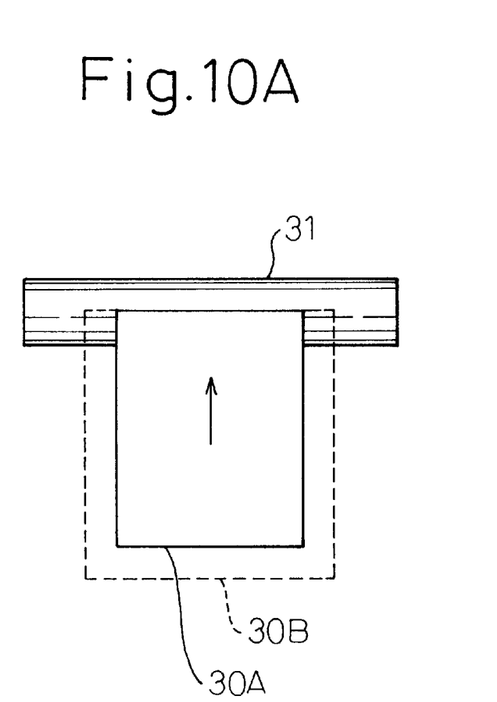
FIGS. 10A and 10B are views explaining problems of the prior art.
Figure 10B:
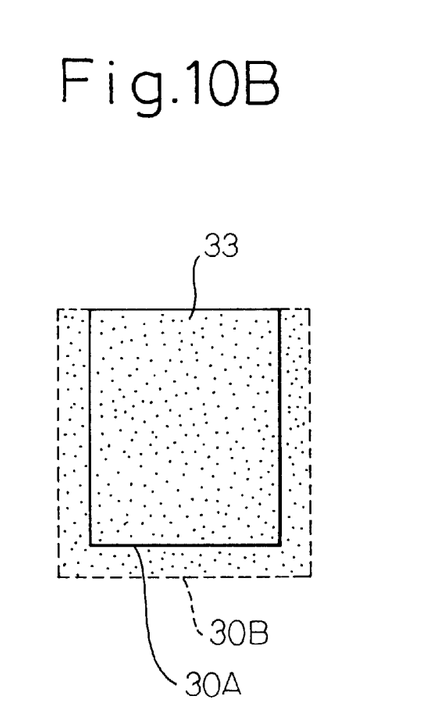

When a document is read by a conventional scanner as described above, the size of a sheet is usually designated in advance, as shown in FIG. 10A, and the designated size designated is read and processed. In FIGS. 10A and 10B, 30A is an actual sheet size, and 30B is a designated size. 31 is a sheet transport roller and 33 is a read data. In this case, however, since the designated size 30B is read even when a sheet 30A of different size or of not-standard size is to be read, as shown in FIG. 10B, there is a drawback in that portions other than the sheet 30A are also read.

Data so read, therefore, results in inclusion of unnecessary data, and a computer using data so read ends in using the memory capacity thereof in excess of what should have been used for the form. In addition, a user of a scanner is forced to experience the inconvenience of deleting an unnecessary read portion as required after reading, by using an image processing program. Furthermore, there is also caused a problem of producing wasted time in reading.

SUMMARY OF THE INVENTION

The present invention is made in view of the above problems in the prior art and an object of the present invention is to provide a control device for a scanner, a scanning document reader and a memory medium having therein a scanner driver program that does not waste the memory capacity of a computer by ignoring a portion of data appearing outside a medium even if the protruding portion is within a scanning range and hence eliminating an occurrence of reading invalid data, which can eliminate the inconvenience, that a user of the scanner is forced to experience, of deleting an unnecessary read portion or portions after reading, by using an image processing program, and which can reduce the reading time.

The present invention provides a control device for controlling a medium reader having a medium transport roller with a surface in a color distinguishable from a color of a medium, the control device comprising a decision means for deciding a valid data portion depending on the color of the medium transport roller, from data read by the medium reader. The control device can decide the valid data portion by adopting this construction.

The present invention also provides a control device for controlling a medium reader having a medium transport roller with a surface in a color distinguishable from a color of a medium, the control device comprising a decision means for causing the medium reader to read at least one line of a medium on the medium transport roller and for deciding a position of a valid data portion depending on a difference between the color of the medium transport roller and the color of the medium, and control means for validating data located at a position of a valid data portion in the subsequent reading. The position of the valid data can be obtained by adopting this construction.

The present invention also provides a control device for controlling a medium reader having a medium transport roller with a surface in a color distinguishable from a color of a medium, the control device comprising a decision means for causing the medium reader to read at least one line of a medium on the medium transport roller and for deciding a position of a valid data portion depending on a difference between the color of the medium transport roller and the color of said medium, and a control means for causing the medium reader read data located at a position of the valid data portion in the subsequent reading. Adopting this construction can make the medium reader read the data located at the position of the valid data.

Preferably, the decision means decides a start position and a length of valid data, as the valid data portion. Or, the decision means decides a start position and an end position of valid data, as said valid data portion. By adopting these constructions, the control device can decide the start position and the length of the valid data.

The present invention also provides a control device for controlling a medium reader having a medium transport roller with a surface in a color distinguishable from a color of a medium, in a control device comprising a decision means for deciding a final line of a medium on the medium transport roller when the color of all data read by the medium reader becomes identical to the color of the surface of the medium transport roller while said medium is read by the medium reader. By adopting this construction, the final line of the medium can be decided.

Preferably, the decision means decides the length of a medium in a medium transport direction. The control device dan detect the trailing end and decide the length of the medium in the medium transport direction.

The present invention also provides a control device for controlling a medium reader having a medium transport roller with a surface in a color distinguishable from a color of a medium, the control device comprising a first decision means for causing the medium reader to scan at least one line of a medium on the medium transport roller and for deciding a valid data portion depending on the color of the medium transport roller, a second decision means for reading the medium on the medium transport roller by the medium reader and for deciding a final line of the medium on said medium transport roller when the color of all data so read becomes identical to the color of the surface of the medium transport roller, and a size decision means for deciding the size of the medium in response to the first and second decision means. By adopting the construction, the control device can decide the size of the medium from the valid data portion and the final line of the data. Since only the valid data portion can be read through the above construction, the reading time can be reduced.

The present invention further provides a medium reader comprising a medium transport roller with a surface in a color distinguishable from a color of a medium, a reader means for reading a medium on the medium transport roller, and a decision means for deciding a valid data portion of data read by said reader means depending on the color of the medium transport roller. The medium reader can decide the valid data portion by adopting the above construction.

The present invention also provides a medium reader comprising a medium transport roller with a surface in a color distinguishable from a color of a medium, a reader means for reading a medium on the medium transport roller, decision means for causing the reader means to read at least one line of a medium on the medium transport roller and for deciding a position of a valid data portion depending on a difference between the color of the medium transport roller and the color of the medium, and control means for validating data located at the position of the valid data portion in the subsequent reading. By adopting this construction, data located at the position of valid data can be obtained.

The present invention also provides a medium reader comprising a medium transport roller with a surface in a color distinguishable from a color of a medium, a reader means for reading a medium on the medium transport roller, decision means for causing the reader means to read at least one line of a medium on the medium transport roller and for deciding a position of a valid data portion depending on a difference between the color of the medium transport roller and the color of the medium, and control means for causing the reader means read data located at the position of the valid data portion in the subsequent reading. The medium reader can decide the start of the valid data and the valid data length by adopting the above construction.

The present invention also provides a medium reader comprising a medium transport roller with a surface in a color distinguishable from a color of a medium, reader means for reading a medium on the medium transport roller, and decision means for deciding a final line of the medium when the color of all data read by the reader means becomes identical to the color of the surface of the medium transport roller. By adopting this construction, the medium reader can decide the length of the medium in the direction in which it is carried by detecting the trailing end of the medium.

The present invention also provides a medium reader comprising a medium transport roller with a surface in a color distinguishable from a color of a medium, reader means for reading a medium on the medium transport roller, first decision means for causing the reader means to read at least one line of a medium on the medium transport roller and for deciding a position of a valid data portion depending on a difference between the color of the medium transport roller and the color of the medium, second decision means for deciding a final line of the medium when the color of all data read by the reader means becomes identical to the color of the surface of the medium transport roller, and size decision means for deciding the size of the medium in response to the first and second decision means. By adopting this construction, the medium reader can decide the size of the medium from the valid data portion and the final line of the medium, whereby since only the valid portion can be read, the reading time can be reduced.

The present invention further provides a memory medium readable by a computer and having a program stored therein for controlling a medium reader having a medium transport roller with a surface in a color distinguishable from a color of a medium, the memory medium having a program recorded therein for causing the computer to realize a function to decide a valid data portion depending on the color of the medium transport roller, from data read by said medium reader. By adopting this construction, the computer readable record medium can decide the valid data portion.

The present invention also provides a memory medium readable by a computer and having a program stored therein for controlling a medium reader having a medium transport roller with a surface in a color distinguishable from a color of a medium, the memory medium having a program recorded therein for causing a computer to realize a decision function to cause the medium reader to read at least one line of a medium on the medium transport roller and to decide a position of a valid data portion depending on a difference between the color of the medium transport roller and the color of the medium, and a control function to validate data located at the position of the valid data portion in the subsequent reading. The memory medium can decide the start position of the valid data and the valid data length by adopting the above construction.

The present invention also provides a memory medium readable by a computer and having a program stored therein for controlling a medium reader having a medium transport roller with a surface in a color distinguishable from a color of a medium, the memory medium having a program recorded therein for causing a computer to realize a decision function to cause the medium reader to read at least one line of a medium on the medium transport roller and to decide a position of a valid data portion depending on a difference between the color of the medium transport roller and the color of the medium, and a control function to cause the medium reader to read data located at the position of the valid data portion in the subsequent reading. The memory medium can decide the start position of the valid data and the valid data length by adopting the above construction.

The present invention also provides a memory medium readable by a computer and having a program stored therein for controlling a medium reader having a medium transport roller with a surface in a color distinguishable from a color of a medium, the memory medium having a program recorded therein for causing a computer to realize a decision function to decide a final line of a medium on the medium transport roller when the color of all data read becomes identical to the color with the surface of the medium transport roller while the medium is read by the medium reader. The memory medium can decide the length of the medium in a direction in which it is carried by detecting the trailing end thereof.

The present invention also provides a memory medium readable by a computer and having a program stored therein for controlling a medium reader having a medium transport roller with a surface in a color distinguishable from a color of a medium, the memory medium having a program recorded therein for for causing a computer to realize a first decision function to cause the medium reader to scan at least one line of a medium on the medium transport roller and to decide a valid data portion depending on the color of the medium transport roller, a second decision function to cause the medium reader to read the medium on the medium transport roller and to decide a final line of the medium on the medium transport roller when the color of all data read becomes identical to the color of the surface of the medium transport roller, and a size decision function to decide the size of the medium in response to the first and second decision functions. By adopting this construction, the medium medium can decide the size of the medium from the valid data portion and the final line thereof.

BRIEF DESCRIPTION OF THE DRAWINGS

The present invention will become more apparent from the following description of the preferred embodiments with reference to the accompanying drawings in which.

DESCRIPTION OF THE PREFERRED EMBODIMENTS

Figure 1:
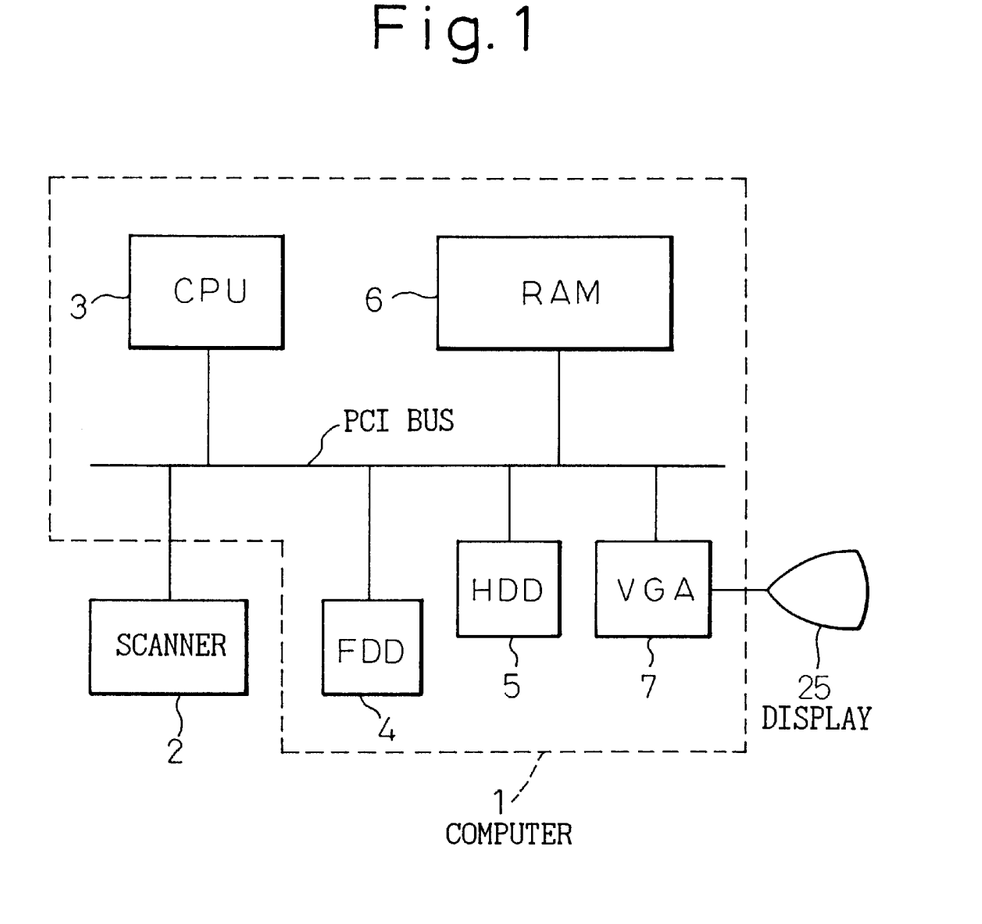
FIG. 1 is a block diagram illustrating a scanning document reader according to the embodiment of the present invention.

FIG. 1 is a block diagram illustrating a scanning document reader according to the embodiment of the present invention. In FIG. 1, reference numeral 1 denotes a computer, and reference numeral 2 denotes a scanner connected to a PCI bus of the computer. The computer 1 comprises a CPU (central processing unit) 3, an FDD (floppy disc drive) 4, an HDD (hard disc drive) 5, a RAM (system memory) 6, and a VGA (video graphic adapter) 7 having a display connected thereto for controlling graphics of the display, which are all connected to the PCI buss. A program is provided by a portable memory medium in the floppy disc drive 4 or the like and installed in the hard disc 5 of the computer system.

The program may be installed in a stationary type memory medium such as the hard disc 5 mounted to the computer from the beginning. When used herein, the term "memory medium" includes both a portable type memory medium and the stationary type memory medium. In the computer system, the program installed in the hard disc is read and delivered to the RAM 6 as the system memory, so that the program is executed by the CPU 3.

Figure 2:
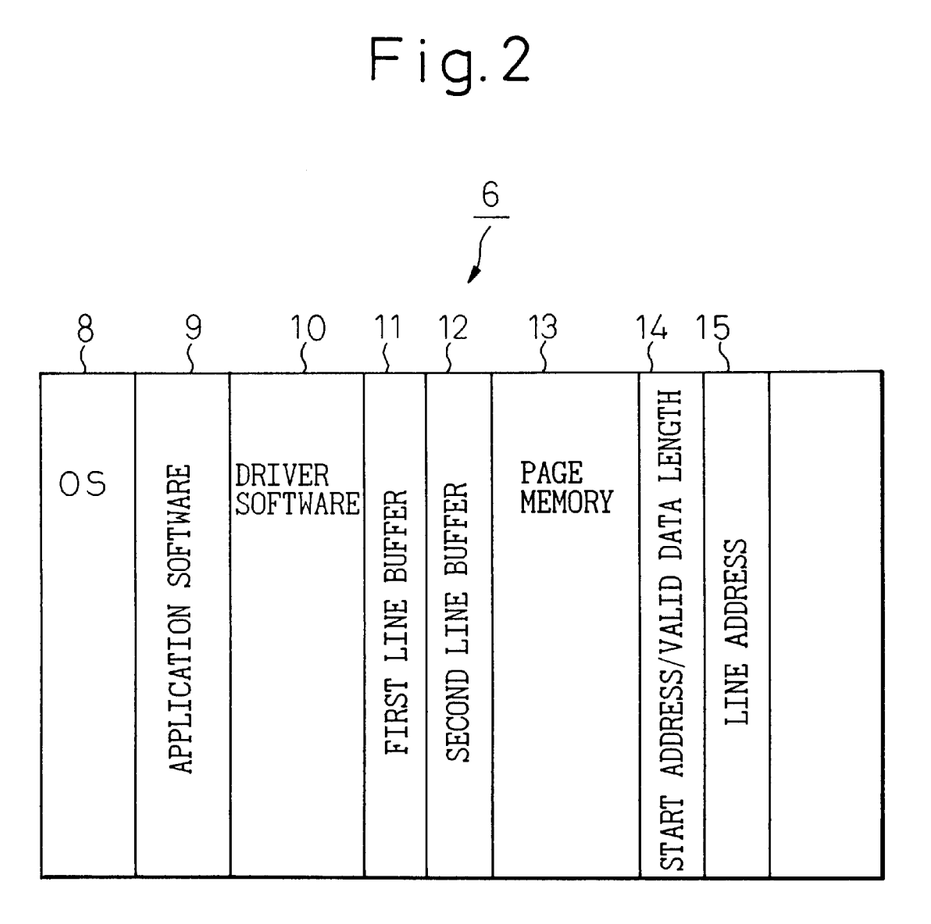
FIG. 2 is a diagram showing the contents of the memory shown in FIG. 1.

In addition, as shown in FIG. 2, the RAM 6 includes storage areas in which an OS (operating system) 8, application software 9, drive software 10 for the scanner, a first line buffer 11, a second line buffer 12 and a page memory 13 are set, and the page memory 13 includes memory areas such as a start address/valid data length 14 and a line address 15. The aforesaid first line buffer 11 and second line buffer 12 are used as work areas in the system memory. Software therefor is executed by the CPU 3.

Figure 3A:
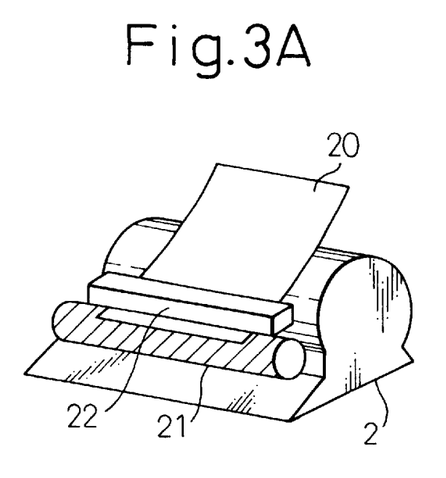
FIG. 3A is a perspective view of the scanner.
Figure 3B:
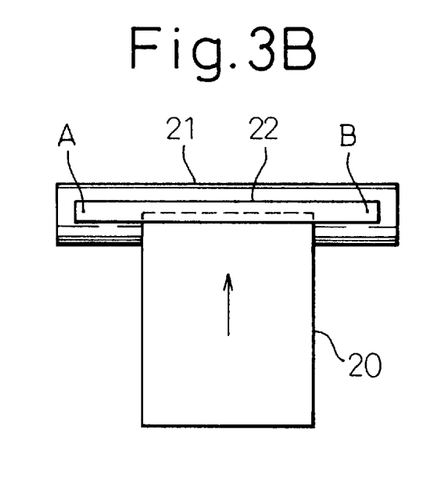
FIG. 3B is a plan view of the scanner.

The scanner 2 is constructed as shown in FIGS. 3A and 3B, wherein FIG. 3A is a schematic perspective view of the scanner 2, and FIG. 3B is a plan view showing a main part thereof. In those figures, reference numeral 20 shows a sheet of paper or a document. The sheet 20 is herein used as an example of a medium that is read. The medium is not necessarily a paper sheet but it may be formed from other materials. In addition, the medium is not necessarily a printed medium (for instance, characters and pictures are printed on paper), but it may be a hand written document. Reference numeral 21 denotes a feed roller (a medium transport roller) for feeding the sheet 20, and reference numeral 22 denotes a sensor for reading images on the sheet 20. The surface of the feed roller 21 is imparted a color, for instance, of black that is distinguishable from the color of the sheet 20 (in the description to be made below, the color of the roller surface is described as black, but the color is not limited to black and other colors, for instance, brown may be used). That is, the reader optically scans the sheet 20, and the color of the surface of the feed roller 21 may be one which is optically distinguishable from the color of the sheet 20. The sheet 20 is generally white. The sheet is white and the roller is black in the embodiment but the sheet may be blue and the roller may be red. Since a color scanner can recognize not only white and black but also other colors, it is possible to consider a modification in which the medium is blue, while the roller is red. In addition, the sensor 22 has a length which is long enough to cover the maximum width of the sheet 20 used. In addition, the scanner 2 includes a paper sensor (not shown) by which the upper end of the sheet 20 can be detected.

Figure 3C:
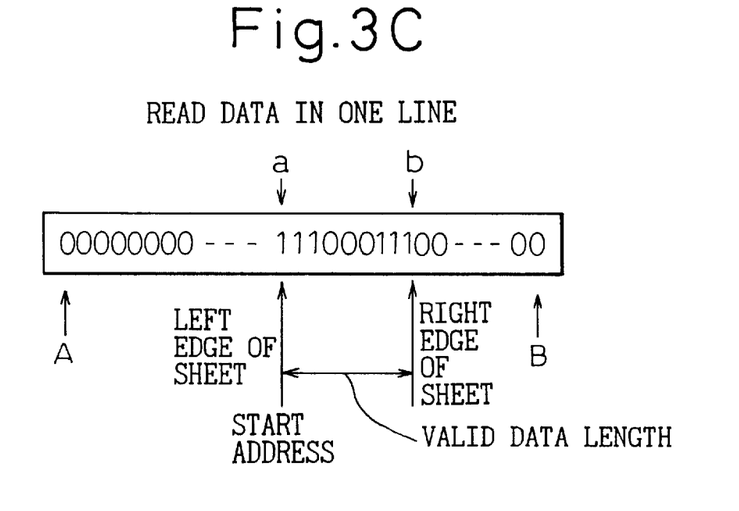
FIG. 3C is a view illustrating data read by the sensor of the scanner.

Referring to FIGS. 1 to 3, the operation of the embodiment of the present invention will be described below. First, when the sheet 20 is fed onto the feed roller 21, a first line is read by the sensor 22 and the result is stored in the first line buffer 11. In this case, the sensor 22 reads a read width over the roller 21 and the sheet 20 from a point A to a point B, as shown in FIG. 3B. The sensor 22 reads a portion of the feed roller 21 which is black, from the point A to the left edge of the sheet 20, and therefore, as shown in FIG. 3c, zero bits continue as 000 . . . .

The sensor 22 then starts to read a portion of the sheet 20, and one bits continue as 111 . . . , since the sheet is white. As reading by the sensor 22 continues further, zero bits may emanate if there are black images along the line, and one bit may emanate again at the right margin of the sheet 20. Then, when the sensor 22 reads a portion of the feed roller 21 beyond the right edge of the sheet 20, which is black, zero bits continue as 000 . . . .

Data read by the scanner 2 is then delivered to the first line buffer 11 from the driver 10. In the first line buffer 11, data are judged whether they are one or zero, and black data (invalid data) is deleted and valid data (start address, valid data length) is obtained, so that the valid data are stored in the memory area 14 for the start address/valid data length of the page memory 13.

The scanner 2 subsequently reads the second line and so on. In this reading, the scanner 2 starts reading from the storing position of the actual data 111 . . . , i.e., the starting position of the valid data portion, until the end of the actual data 111 . . . In other words, the scanner 2 thus reads the data along the valid data length. The portions of data at the left end and at the right end indicated by 000 . . . (invalid data) are ignored and the intermediate portion therebetween only is read as the valid data length (sheet width). Only the portion of the valid data length is read from the second line.

According to this construction, since portions other than the sheet are not read even with a sheet of a different size such as a non-standard sized sheet, the reading time can be reduced. In addition, data read by a conventional scanner include unnecessary data and this uses the memory capacity of a computer using data so read in excess of what should have been used only for the sheet. In this embodiment of the present invention, however, such a drawback is eliminated and the necessity is obviated of deleting the unnecessary data portions, through image processing, after reading is completed.

In addition, when all the data of the whole one line become 0, the scanner 2 detects a trailing end of the sheet 20. From this, the longitudinal length of the sheet can also be recognized. This is posted to the application software 9, and the application software 9 once so posted can drive the scanner 2 in accordance with the size of the sheet when scanning the next sheet. Thus, lateral and longitudinal invalid data portions are prevented from being read, whereby the reading speed can be improved.

Moreover, since data on portions of the feed roller are made invalid, the memory capacity of a computer does not have to be large in the case where data read is stored in a memory (RAM 4 or HDD 5) of the computer device. In addition, since image data read include only the portion of the sheet but do not include the portions of the feed roller, the image so read is easy to view for those who manage or use such read data compared with the prior art example. Furthermore, when reading is carried out with the conventional construction, data read include the portions of the feed roller, and when trying to fetch data including only the portion of the sheet without adopting the present invention, the data read have to be processed using an image edit program. With the present invention, data on the sheet portion can be fetched without such an additional process.

Figure 4:
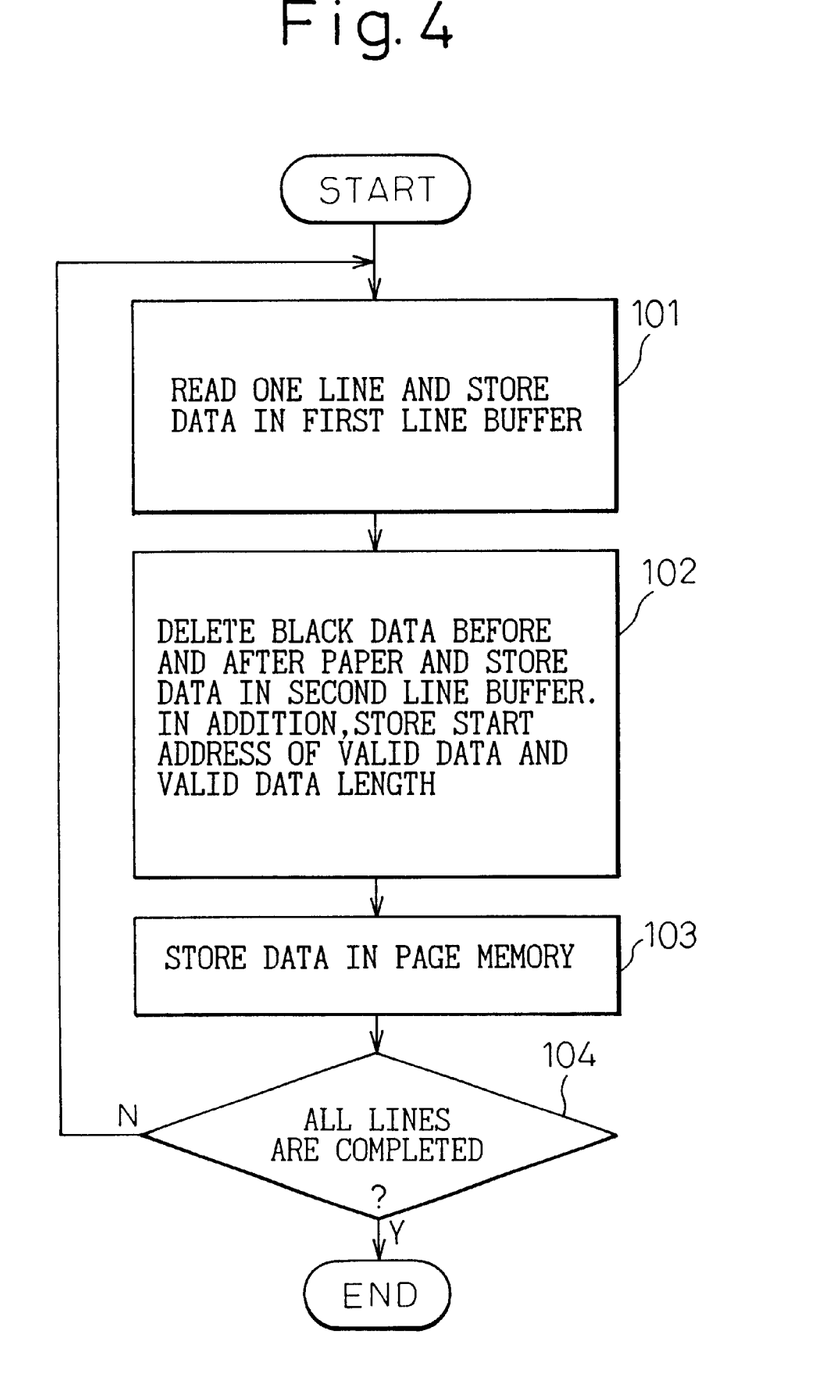
FIG. 4 is a flow chart showing an example of the scanner driver program stored in the memory medium.

FIG. 4 is a flow chart showing a first example of the scanner driver program according to the present invention. The embodiment will be described, referring to FIGS. 1 to 4.

At step 101, when the sheet 20 is delivered onto the feed roller 21, a first line is read by the sensor 22, and the result is stored in the first line buffer 11. In this case, the sensor 22 reads the read width from the point A to the point B, as shown in FIG. 3B. In this case, the sensor 22 reads the black portion of the feed roller 21 from the point A to the left edge of the sheet 20, and zero bits continue as 000 . . . as shown in FIG. 3C.

The sensor 22 then starts to read the portion of the sheet 20, and one bits continue as 111 . . . , since the sheet 20 is white. As the sensor 22 continues to read, there are emanated zero bits if there is a black portion along the line, and zero bits as 000 . . . finally appear as the margin of the sheet at the end of the line. Then, when the reading of the sensor 22 exits the right edge of the sheet 20, the sensor 22 encounters again another black portion of the feed roller 21, and therefore zero bits again continue as 000 . . . .

At step 102, data read by the scanner (data stored in the first line buffer 11) are then judged whether they are 0 or 1, and the black data (invalid data) are deleted.

Namely, the initial portion before the sheet 20 where zeros repeat and the end portion after the sheet 20 where zeros repeat, as shown in FIG. 3C are invalid data. Data from the leading (left) edge "a" to the trailing (right) edge "b" of the sheet resulting from the deletion of the invalid data are then stored in the second line buffer 12.

The address of the left edge "a" of the sheet is then obtained as a start address or position, and a data length from the left edge "a" to the right edge "b" of the sheet is obtained as a valid data length, and they are each stored in the start address/valid data length storing area 14 in the RAM shown in FIG. 2. (step 103).

At step 104, processes of steps 101 to 103 are repeated for the all lines of the sheet and the flow is completed.

Figure 5:
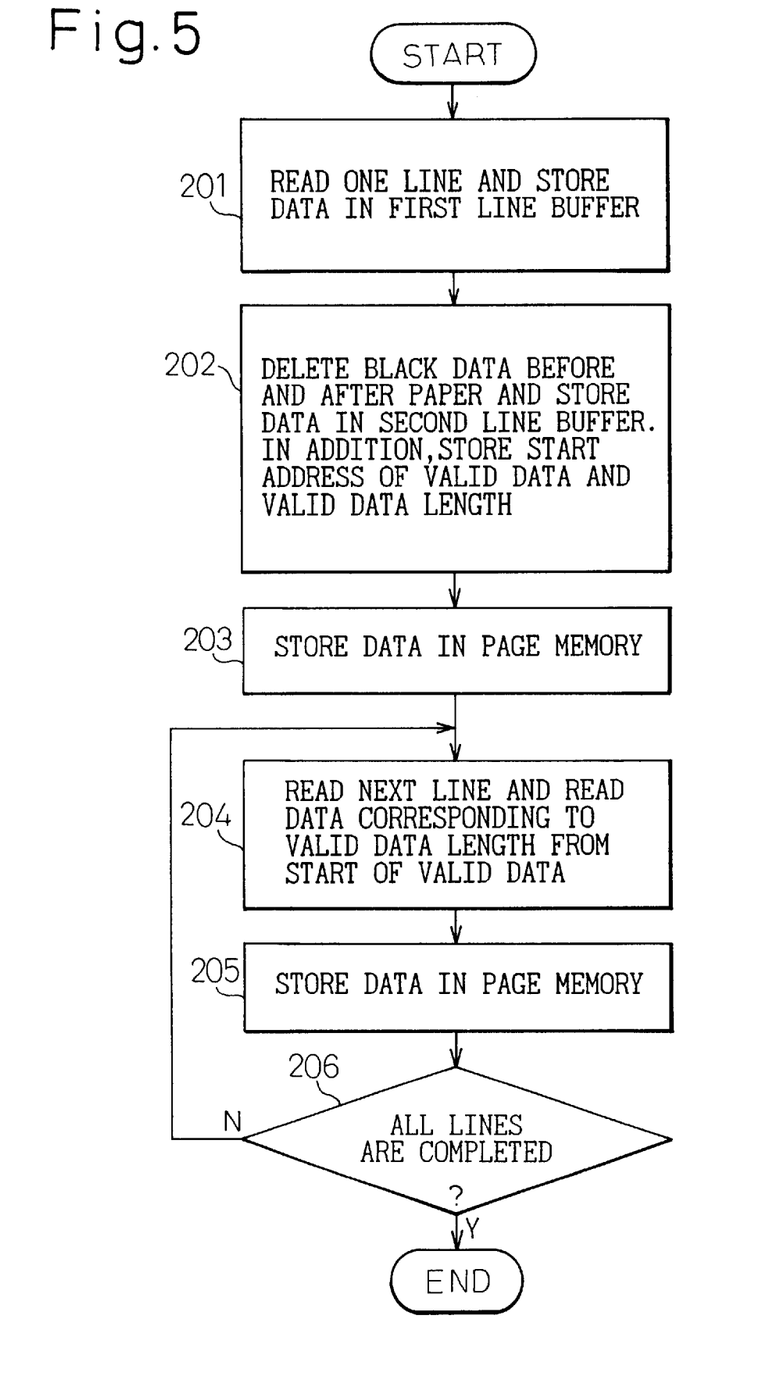
FIG. 5 is a flow chart showing another example of example of the scanner driver program stored in the memory medium.

FIG. 5 is a flow chart showing a second example of the scanner driver program of the present invention. The embodiment will be described by referring to FIGS. 1 to 3 and 5.

At step 201, when the sheet 20 is sent onto the feed roller 21, a first line is read with the sensor 22, and the data is stored in the first line buffer 11. In this case, the sensor 22 reads the read width from the point A to the point B, as shown in FIG. 3B. However, since the sensor 22 reads the black portion of the feed roller 21 from the point A to the left edge of the sheet 20, zero bits continue as 000 . . . , as shown in FIG. 3C.

The sensor 22 then starts to read the portion of the sheet 20, and one bits continue as 111 . . . , since the sheet is white. As the sensor 22 continues to read, there are emanated zero bits if there is a black portion along the line, and zero bits as 000 . . . appear as the margin of the sheet at the end of the line. Then, when the reading of the sensor 22 exits the right edge of the sheet 20, the sensor 22 again encounters another black portion of the roller, and therefore zero bits again continue as 000 . . . .

At step 202, data read by the scanner (data stored in the first line buffer 21) are then judged whether they are 0 or 1, and the black data (invalid data) are deleted.

Namely, the initial portion before the sheet where zeros continue to appear and the end portion after the sheet where zeros continue to appear, as shown in FIG. 3C are invalid data. Data from the leading edge "a" to the trailing edge "b" of the sheet resulting from the deletion of the invalid data are then stored in the second line buffer 12.

The address of the left edge "a" of the sheet is obtained as a start address or position, and a data length from the left edge "a" to the right edge "b" of the sheet is obtained as a valid data length, and they are each stored in the start address/valid data length storing area 14 in the RAM shown in FIG. 2 (step 203).

At step 204, the next line is read, and is stored in the first line buffer 11. Then, a portion of the data corresponding to the valid data length from the start of the valid data (start of data ones) stored in the first line buffer 11 obtained at step 202 is stored in the second line buffer 12.

At step 205, the valid data portion from the start thereof obtained at step 204 is stored in the page memory 13.

At step 206, steps 204 and 205 are repeated until the reading of all lines of the sheet are completed, and thus, the processing of all the lines is completed.

As described above, from the second line the computer starts reading the effective length from the point where 111 . . . start, i.e. the start position of actual data, to the point where 111 . . . end. In other words, the starting and ending portions of the data both indicated by 000 . . . are ignored and the intermediate portion therebetween is read as the valid data length (form width). This prevents the invalid data portion from being read, and therefore, the reading time can be reduced.

Moreover, since data on portions of the feed roller 21 are made invalid, the memory capacity of the computer does not have to be large, which has to be considered when storing data read in the memory (RAM 4 or HDD 5) of the computer system. In addition, since image data read include only the portion of the sheet 20 but do not include the portions of the feed roller 21, the image so read is easy to view for those who manage or use such read data, compared with the prior art example. Furthermore, when reading is carried out with the conventional construction, data read include the portions of the feed roller, and when trying to fetch data including only the portion of the sheet without adopting the present invention, the data read have to be processed using an image editing program. With the present invention, data on the sheet portion can be fetched without such an additional process.

Figure 6:
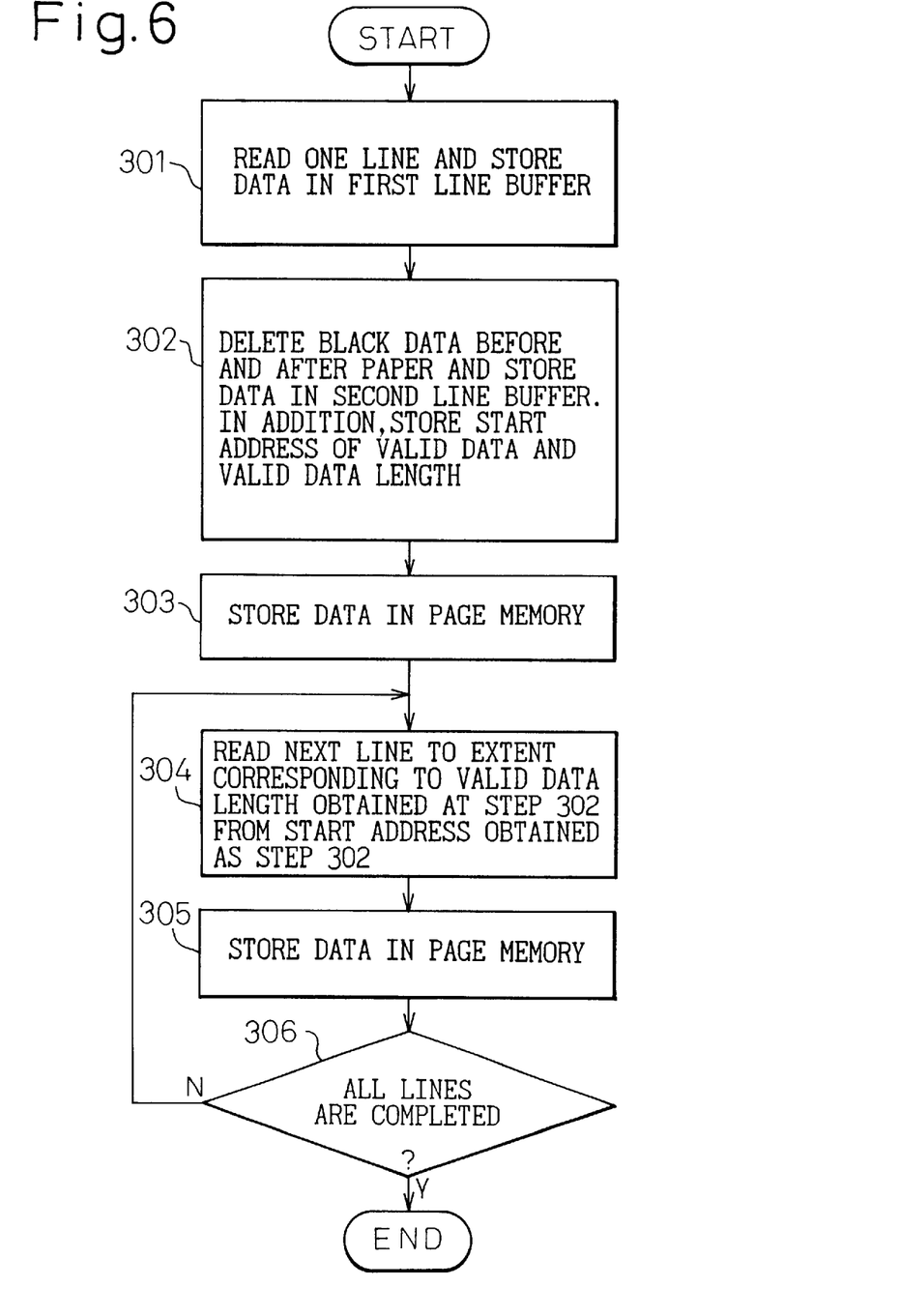
FIG. 6 is a flow chart showing a third example of the scanner driver program stored in the memory medium.

FIG. 6 shows a flow chart showing a third example of the scanner driver program of the present invention. The flow chart will be described, referring to FIGS. 1 to 3 and 6.

At step 301, when the sheet 20 is sent onto the feed roller 21, a first line is read with the sensor 22, and is stored in the first line buffer 11. In this case, the sensor 22 reads the read width from the point A to the point B, as shown in FIG. 3B. The sensor 22 reads the black portion of the feed roller 21 from the point A to the left edge of the form 20, as shown in FIG. 3(C), bits continue to show 0 as 000 . . . .

At step 302, data read by the scanner (data stored in the first line buffer 11) are then discriminated between 0 and 1, and the black data (invalid data) are deleted.

Namely, the initial portion before the sheet where 0 continues to appear and the end portion after the sheet where 0 continues to appear, as shown in FIG. 3C, are invalid data. Data from the left edge "a" to the right edge "b" of the sheet resulting from the deletion of the invalid data are then stored in the second line buffer 12.

The address of the left edge "a" of the sheet is obtained as a start address, and a data length from the left edge "a" to the right edge "b" of the sheet is obtained as a valid data length, and they are each stored in the start address/valid data length storing area 14 on the RAM 6 shown in FIG. 2 (step 303).

At step 304, data corresponding to the valid data length obtained at step 302 is read from the start address obtained at step 302. At step 305, data corresponding to the valid data length obtained at step 304 is stored in the page memory 13.

At step 306, steps 304 and 305 are repeated and the all lines are finished with. This allows only data corresponding to the valid data length to be read and prevents the invalid data from being read, and therefore, the read speed can be made faster.

Figure 7:
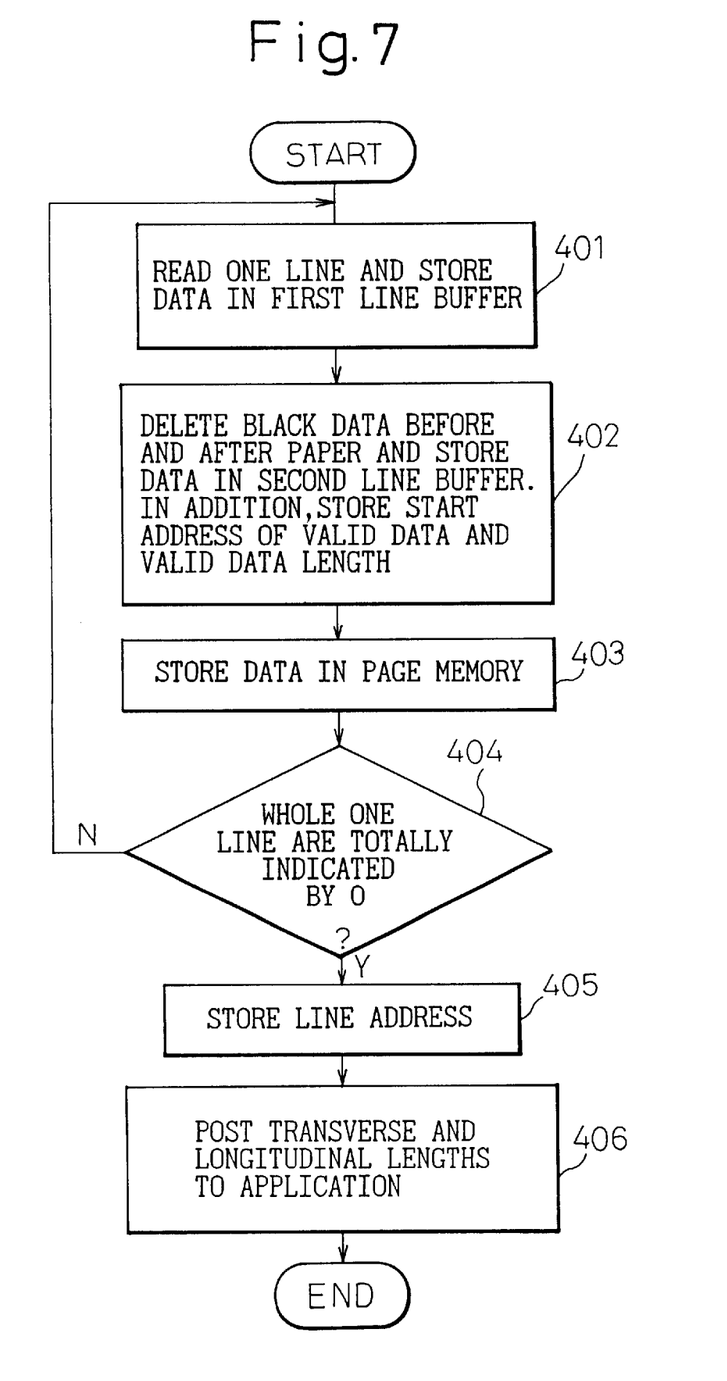
FIG. 7 is a flow chart showing a fourth example of the scanner driver program stored in the memory medium.

FIG. 7 shows a flow chart showing a fourth example of the scanner driver program of the present invention. The flow chart will be described by referring to FIGS. 1 to 3 and 7.

At step 401, when the sheet 20 is sent onto the feed roller 21, a first line is read with the sensor 22, and is stored in the first line buffer 11. In this case, the sensor 22 reads the read width from the point A to the point B, as shown in FIG. 3B. The sensor 22 reads the black portion of the feed roller from the point A to the left edge of the sheet 20, as shown in FIG. 3C, and the bits continue to be 0 as 000 . . . .

At step 402, data read by the scanner (data stored in the first line buffer 11) are then discriminated between 0 and 1, and the black data (invalid data) are deleted.

Namely, the initial portion before the sheet where 0 continues to appear and the end portion after the sheet where 0 continues to appear, as shown in FIG. 3C, are invalid data. Data from the left edge "a" to the right edge "b" of the sheet resulting from the deletion of the invalid data are then stored in the second line buffer 12.

The address of the left edge "a" of the sheet is obtained as a start address, and a data length from the left edge "a" to the right edge "b" of the sheet is obtained as a valid data length, and they are each stored in the start address/valid data length storing area 14 on the RAM 6 shown in FIG. 2 (step 403).

At step 404, when the line is read with the scanner 2, if the whole one line is not totally indicated by zeros (000 . . . ) then the process return to step 401, and steps 401 to 404 are repeated until the whole one line is totally indicated by zeros.

At Step 405, if the whole one line is totally indicated by zeros in step 404, the process proceeds to step 105 where a line address when one line is totally indicated by zeros is stored in the page memory 13.

At step 406, the transverse length of the sheet is recognized from step 402, while the longitudinal length of the sheet is recognized from step 405, and they are posted to the application 9.

This allows the application 9 to drive the scanner 2 via the computer 1 based on the size of the sheet for the next reading and hence reading of the transverse and longitudinal invalid data portions are prevented, whereby the read speed can be improved.

Moreover, as is described above, since data on portions of the feed roller are made invalid, the memory capacity of a computer does not have to be large which has to be considered when storing read data in a memory (RAM 4 or HDD 5) of a computer system. In addition, since image data include only the portion of the sheet but do not include the portions of the feed roller, the image so read is easy to view for those who manage or use such read data, compared with the prior art example. Furthermore, when reading is carried out with the conventional construction, data read include the portions of the feed roller, and when trying to fetch data including only the portion of the sheet without adopting the present invention, the data read have to be processed using an image editing program. With the present invention, data on the sheet portion can be fetched without such an additional process.

Figure 8:
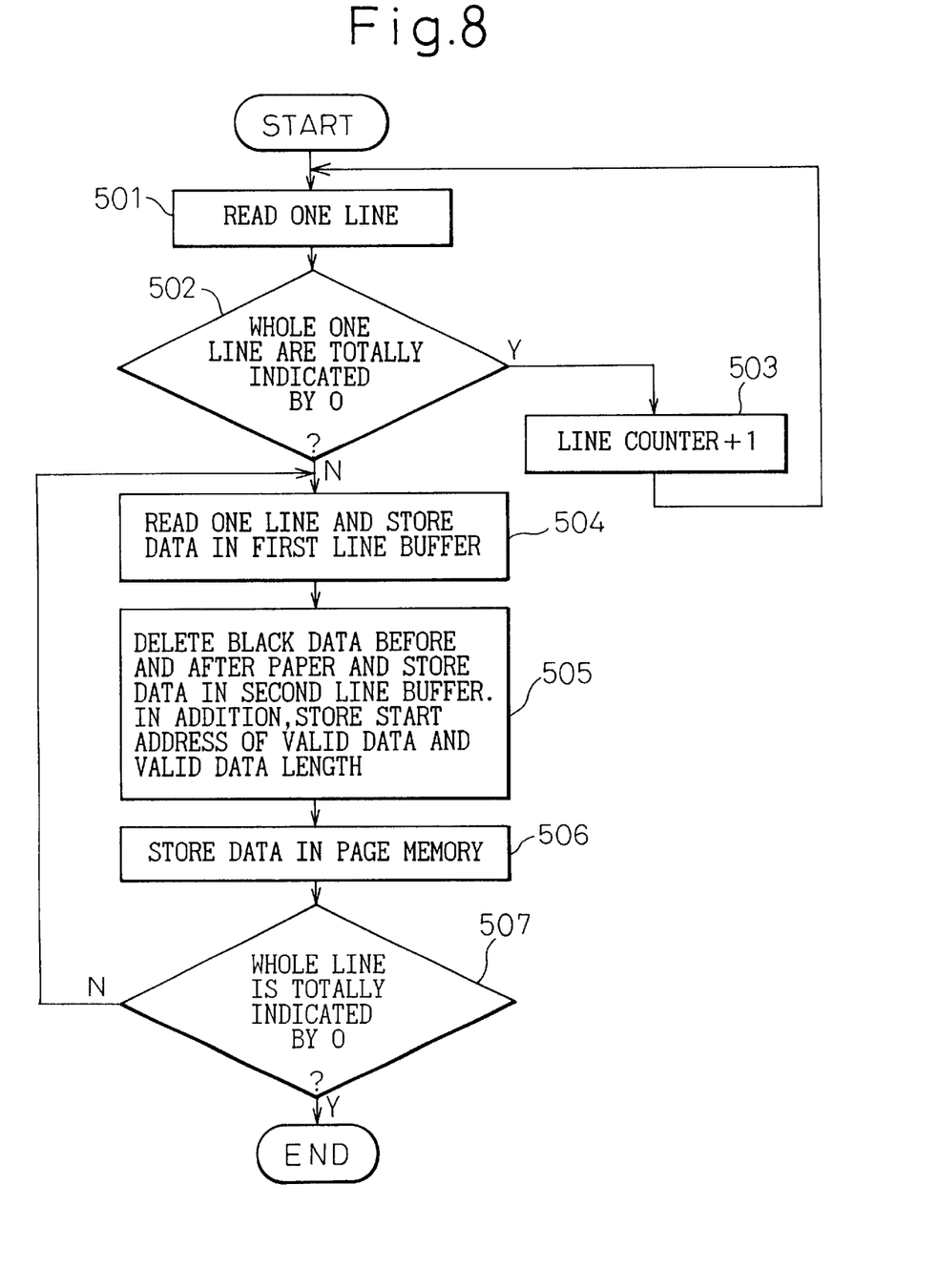
FIG. 8 is a flow chart showing a fifth example of the scanner driver program stored in the memory medium.

FIG. 8 shows a flow chart showing a fifth example of the scanner driver program of the present invention. The flow chart will be described, referring to FIGS. 1 to 3 and 8.

At step 401, when the sheet 20 is sent onto the feed roller 21, a first line is read with the sensor 2. At step 502, it is judged whether or not the whole one line is totally indicated by zeros, and if the line is totally indicated by zeros, the process proceeds to step 503 to add 1 to a line counter and return to step 501. If the line is not totally indicated by zeros, at the process proceeds to step 504 at which one line is read and stored in the first line buffer 11 since there are valid data in the line.

At step 505, black data in the initial and end portions of the line before and after the sheet are deleted and the remaining is stored in the second line buffer 12. In addition, the valid data start address and the valid data length are stored in the start address/valid data length store area.

At step 506, the valid data start address and the valid data length obtained at step 505 are stored in the page memory 13.

At step 507, when the whole lines are not indicated by zeros, the process return to step 504, and the steps to 507 are repeated, and when the whole lines come to be indicated by zeros, the process is completed. Thus, the left edge of the sheet can be recognized at step 504, and the width and the right edge of the sheet can be recognized, respectively, at steps 505 and 507.

With the memory medium constructed according to the present invention, even if a sheet is used which is narrower than the width of the sensor, when portions of the feed roller protruding from the sheet and having a color different from that of the sheet are read, they are ignored as invalid data, whereby the width of the sheet can be recognized. In addition, since it means that the line constitutes a leading or trailing edge of the sheet when the whole one line is totally indicated by zeros before or after the sheet, can be recognized as the length of the sheet by counting the number of lines between the leading and trailing edges. Thereafter, only a valid data portion can be read while ignoring the invalid data portions. When compared with the read time spent reading the invalid data portions as well, the read time for reading only the valid data portion can be reduced, thereby making it possible to improve the read time.

Moreover, as is described above, since data on portions of the feed roller are made invalid, the memory capacity of a computer does not have to be large which has to be considered when storing data read in a memory (RAM 4 or HDD 5) of a computer system. In addition, since image data include only the portion of the sheet but do not include the portions of the feed roller, when compared with the prior art example, the image so read is easy to view for those who manage or use such read data. Furthermore, when reading is carried out with the conventional construction, data read include the portions of the roller, and when trying to fetch data including only the portion of the form without adopting the present invention, the data read have to be processed using an image edit program. With the present invention, data on the form portion can be fetched without such an additional process.

Figure 9:
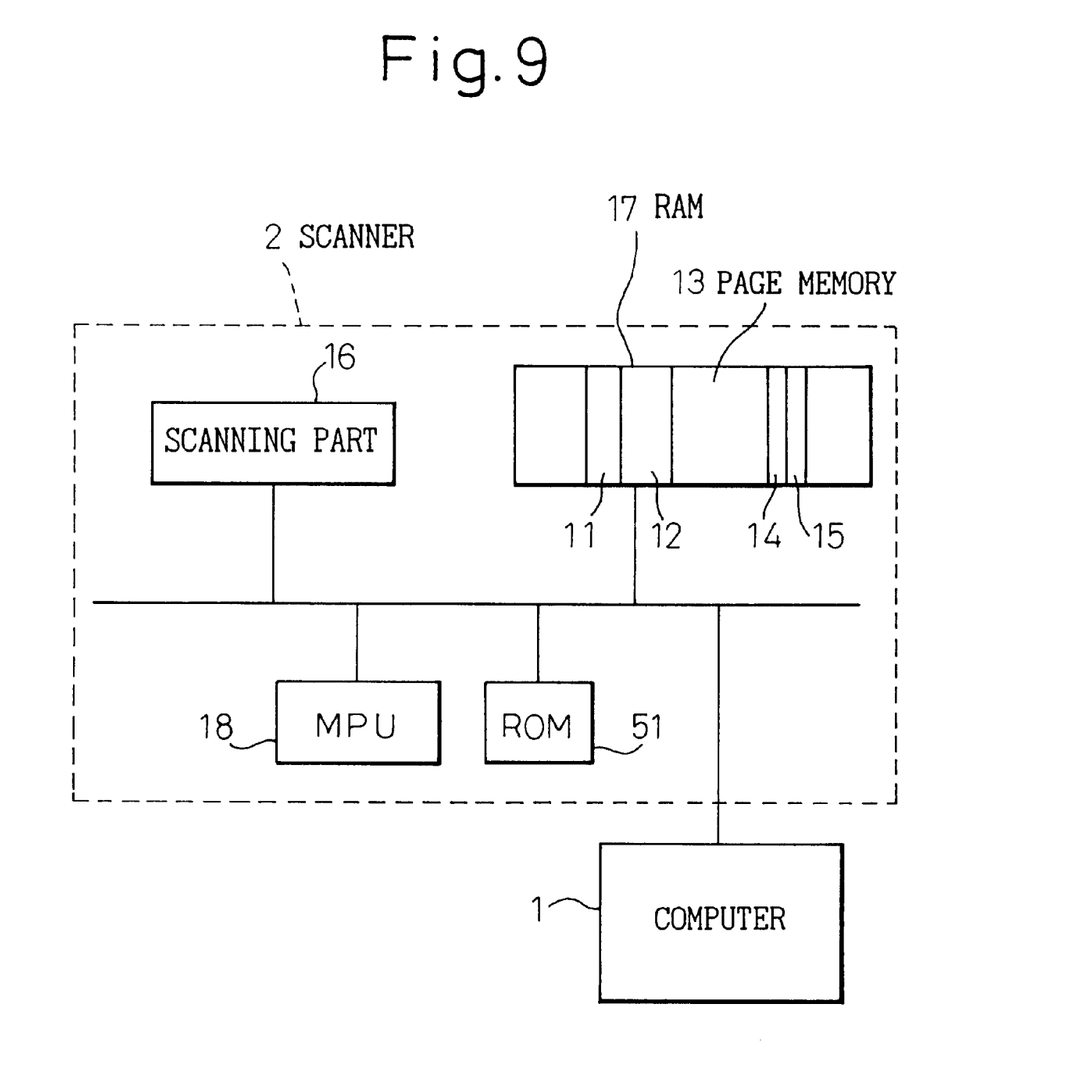
FIG. 9 is a block diagram showing the scanner according to the second embodiment of the present invention.

As is clear from the above description, the present invention has been described heretofore as the scanner being controlled by the computer, but as shown in FIG. 9, a similar operation can be attained even if the control circuit and the aforesaid respective programs are installed in the scanner itself. In FIG. 9, reference numeral 1 denotes a computer, and reference numeral 2 denotes a scanner, which comprises a scanning part 16, a memory 17, an MPU 18 and a ROM 51. The memory 17 is substantially identical to those described in FIGS. 1 and 2 (the RAM 17 does not necessarily requires the OS 8 and the application software 9 for the computer). The ROM 51 is provided instead of the HDD 5 shown in FIGS. 1 and 2, and programs corresponding to those shown in FIGS. 4 to 8 are installed in the ROM 5.

Namely, a program is installed in the ROM 51 which can perform the program operations shown in FIGS. 4 to 8 of the driver software shown in FIG. 2, and when the memory area 12 to 15 shown in FIG. 2 is secured in the RAM 17 provided in the scanner 12 to 15, operations similar to those of the present invention can be executed within the scanner. In other words, the MPU 18 executes the operations of the programs (FIGS. 4 to 8) of the present invention by using the programs (FIGS. 4 to 8) stored in the ROM 51 in the respective memory areas 12 to 15 of the RAM 17. Data read are stored in the page memory 11.

In the mode of operation shown in FIG. 9, the scanner 1 is connected to the computer 1 such that it sends data stored in the page memory 11 to the computer. The present invention can be applied not only to this construction in which the scanner is connected to the computer 1 but also to a construction in which the scanner functions as a separate independent device, such as a device comprising a printing part provided in the scanner for printing out data read. A scanner constructed as described above can perform similar operations and exhibit similar effectiveness to those described referring to FIGS. 1 and 2.

According to the scanner, the scanning document reader and the memory medium installing therein a scanner driver program, since data on the portions of the feed roller are made invalid, the memory capacity does not have to be large which is considered in storing data read into a memory of a computer. In addition, when compared with the conventional example, since the image data portion read includes only the portion of a document form and does not include the portions of the roller, the image data so read becomes easy to view for those who manage and use data read. Furthermore, when reading with the conventional construction, data read from the roller portion are included, and when trying to fetch only data on the document form without adopting the present invention, data read have to be processed through an image editing program. With the present invention, data on the form portions can be fetched without such a process.

What is claimed is:

1. A control device for controlling a medium reader having a medium transport roller with a surface in a color distinguishable from a color of a medium, said control device comprising:

a decision unit deciding a valid data portion depending on the color of said medium transport roller, from data read by said medium reader.

2. A control device for controlling a medium reader having a medium transport roller with a surface in a color distinguishable from a color of a medium, said control device comprising:

a decision unit deciding causing said medium reader to read at least one line of a medium on said medium transport roller and for deciding a position of a valid data portion depending on a difference between the color of said medium transport roller and the color of said medium; and a control unit validating data located at the position of the valid data portion in the subsequent reading.

3. A control device as set forth in claim 2, wherein said decision unit decides a start position and a length of valid data, as said valid data portion.

4. A control device as set forth in claim 2, wherein said decision unit decides a start position and an end position of valid data, as said valid data portion.

5. A control device for controlling a medium reader having a medium transport roller with a surface in a color distinguishable from a color of a medium, said control device comprising:

a decision unit causing said medium reader to read at least one line of a medium on said medium transport roller and for deciding a position of a valid data portion depending on a difference between the color of said medium transport roller and the color of said medium; and a control unit causing said medium reader read data located at the position of the valid data portion in the subsequent reading.

6. A control device as set forth in claim 5, wherein said decision unit decides a start position and a length of valid data, as said valid data portion.

7. A control device as set forth in claim 5, wherein said decision unit decides a start position and an end position of valid data, as said valid data portion.

8. A control device for controlling a medium reader having a medium transport roller with a surface in a color distinguishable from a color of a medium, said control device comprising:

a decision unit deciding a final line of a medium when the color of all data read becomes identical to the color of the surface of said medium transport roller, while said medium on said medium transport roller is read by said medium reader.

9. A control device as set forth in claim 8, wherein said decision unit decides a length of the medium in a medium transport direction.

10. A control device for controlling a medium reader having a medium transport roller with a surface in a color distinguishable from a color of a medium, said control device comprising:

a first decision unit scanning at least one line of a medium on said medium transport roller by said medium reader and for deciding a valid data portion depending on the color of said medium transport roller;

a second decision unit reading said medium on said medium transport roller by said medium reader and for deciding a final line of said medium when the color of all data read becomes identical to the color of the surface of said medium transport roller; and a size decision unit deciding a size of said medium in response to said first and second decision unit.

11. A medium reader comprising:

a medium transport roller with a surface in a color distinguishable from a color of a medium;

a reader reading a medium on said medium transport roller; and a decision unit deciding a valid data portion depending on the color of said medium transport roller, from data read by said reader.

12. A medium reader comprising:

a medium transport roller with a surface in a color distinguishable from a color of a medium;

a reader reading a medium on said medium transport roller;

a decision unit causing said reader to read at least one line of a medium on said medium transport roller and for deciding a position of a valid data portion depending on a difference between the color of said medium transport roller and the color of said medium; and a control unit validating data located at the position of the valid data portion in the subsequent reading.

13. A medium reader comprising:

a medium transport roller with a surface in a color distinguishable from a color of a medium;

a reader reading a medium on said medium transport roller;

a decision unit causing said reader to read at least one line of a medium on said medium transport roller and for deciding a position of a valid data portion depending on a difference between the color of said medium transport roller and the color of said medium; and a control unit causing said reader to read data located at the position of said valid data portion in the subsequent reading.

14. A medium reader comprising:

a medium transport roller with a surface in a color distinguishable from a color of a medium;

a reader reading a medium on said medium transport roller; and a decision unit deciding a final line of said medium when the color of all data read by said reader becomes identical to the color of the surface of said medium transport roller.

15. A medium reader comprising:

a medium transport roller with a surface in a color distinguishable from a color of a medium;

a reader reading a medium on said medium transport roller;

a first decision unit causing said reader means to read at least one line of a medium on said medium transport roller and for deciding a position of a valid data portion depending on a difference between the color of said medium transport roller and the color of said medium;

a second decision unit deciding a final line of said medium when the color of all data read by said reader becomes identical to the color of the surface of said medium transport roller; and a size decision unit deciding a size of said medium in response to said first and second decision unit.

16. A memory medium readable by a computer and having a program stored therein for controlling a medium reader having a medium transport roller with a surface in a color distinguishable from a color of a medium, said memory medium having a program recorded therein for causing a computer to realize:

a function to decide a valid data portion depending on the color of said medium transport roller, from data read by said medium reader.

17. A memory medium readable by a computer and having a program stored therein for controlling a medium reader having a medium transport roller with a surface in a color distinguishable from a color of a medium, said memory medium having a program recorded therein for causing a computer to realize:

a decision function to cause said medium reader to read at least one line of a medium on said medium transport roller and to decide a position of a valid data portion depending on a difference between the color of said medium transport roller and the color of said medium; and a control function to validate data located at the position of the valid data portion in the subsequent reading.

18. A memory medium readable by a computer and having a program stored therein for controlling a medium reader having a medium transport roller with a surface in a color distinguishable from a color of a medium, said memory medium having a program recorded therein for causing a computer to realize:

a decision function to cause said medium reader to read at least one line of a medium on said medium transport roller and to decide a position of a valid data portion depending on a difference between the color of said medium transport roller and the color of said medium; and a control function to cause said medium reader read data located at the position of the valid data portion in the subsequent reading.

19. A memory medium readable with a computer and having a program stored therein for controlling a medium reader having a medium transport roller with a surface in a color distinguishable from a color of a medium, said memory medium having a program recorded therein to cause a computer to realize:

a decision function to decide a final line of a medium on said medium transport roller when the color of all data read becomes identical to the color of the surface of said medium transport roller while said medium is read on the medium transport roller by said medium reader.

20. A memory medium readable with a computer and having a program stored therein for controlling a medium reader having a medium transport roller with a surface in a color distinguishable from a color of a medium, said memory medium having a program recorded therein for causing a computer to realize:

a first decision function to cause said medium reader to scan at least one line of a medium on said medium transport roller and to decide a valid data portion depending on the color of said medium transport roller;

a second decision function to cause said medium reader to read the medium on said medium transport roller and to decide a final line of said medium on said medium transport roller when the color of all data read becomes identical to the color of the surface of said medium transport roller; and a size decision function to decide the size of said medium in response to said first and second decision functions.

* * * * *